United States Patent
Larson

(10) Patent No.: US 11,492,118 B2
(45) Date of Patent: Nov. 8, 2022

(54) POSITIVE UP LOCK 2-PAWL PALLET RESTRAINT

(71) Applicant: GOODRICH CORPORATION, Charlotte, NC (US)

(72) Inventor: Wallace Harold Larson, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 181 days.

(21) Appl. No.: 16/900,571

(22) Filed: Jun. 12, 2020

(65) Prior Publication Data

US 2021/0387726 A1 Dec. 16, 2021

(51) Int. Cl.
*B60P 7/08* (2006.01)
*B64D 9/00* (2006.01)
*B60P 7/13* (2006.01)
*B60P 7/10* (2006.01)

(52) U.S. Cl.
CPC ............. *B64D 9/003* (2013.01); *B60P 7/10* (2013.01); *B60P 7/13* (2013.01)

(58) Field of Classification Search
CPC ...... B60P 7/13; B60P 7/10; B60P 7/18; B64D 9/003; B64D 9/006
USPC .................................. 410/69, 77, 78, 79, 80
See application file for complete search history.

(56) References Cited

U.S. PATENT DOCUMENTS

| 3,693,920 | A | 9/1972 | Trautman |
| 3,796,397 | A | 3/1974 | Alberti |
| 6,425,717 | B1 | 7/2002 | Saggio et al. |
| 6,485,238 | B2 | 11/2002 | Segura |
| 7,556,462 | B2 * | 7/2009 | Huber .................. B64D 9/003 410/80 |
| 2002/0131837 | A1 * | 9/2002 | Segura .................... B60P 7/13 410/77 |
| 2007/0237598 | A1 | 10/2007 | Schulze |
| 2007/0253790 | A1 * | 11/2007 | Boggenstall ............. B60P 7/13 410/77 |
| 2018/0273177 | A1 | 9/2018 | Jayaprakash et al. |

FOREIGN PATENT DOCUMENTS

DE       102014106828      11/2015

OTHER PUBLICATIONS

European Patent Office, European Search Report dated Nov. 3, 2021 in Application No. 21173335.7.

* cited by examiner

*Primary Examiner* — Stephen T Gordon
(74) *Attorney, Agent, or Firm* — Snell & Wilmer L.L.P.

(57) ABSTRACT

A cargo restraint includes a housing. The cargo restraint further includes an inner pawl and an outer pawl coupled to the housing and configured to rotate between a retracted position and an erected position relative to the housing. The cargo restraint further includes a locking pawl rotatably coupled to at least one of the inner pawl or the outer pawl and configured to rotate between a locked position in which the inner pawl and the outer pawl are locked in the erected position and an unlocked position.

20 Claims, 2 Drawing Sheets

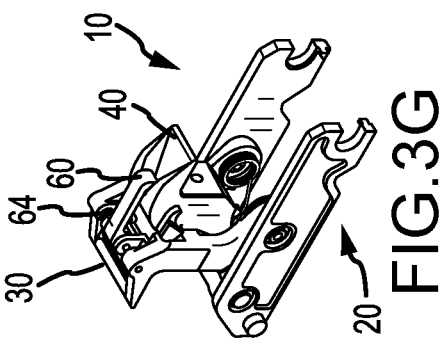
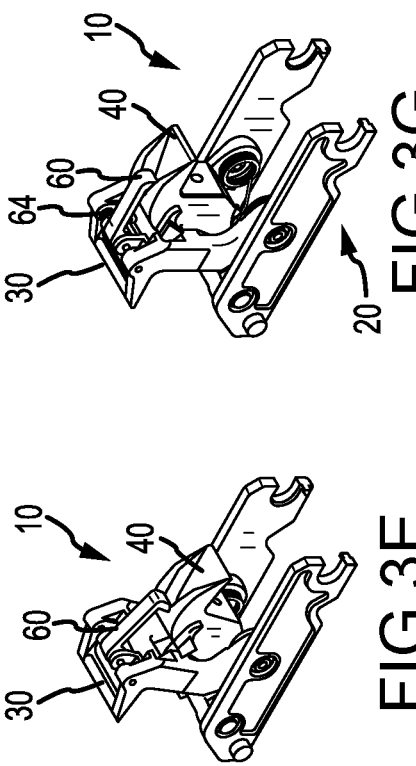
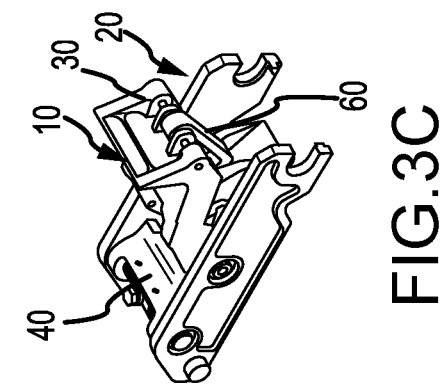
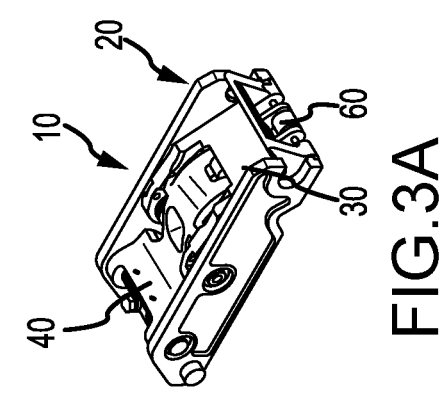
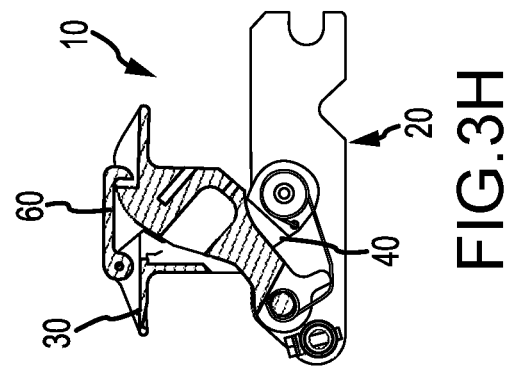
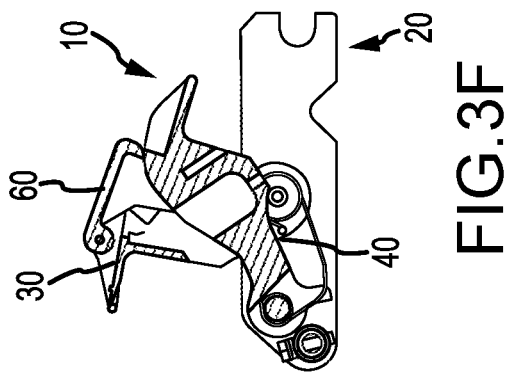
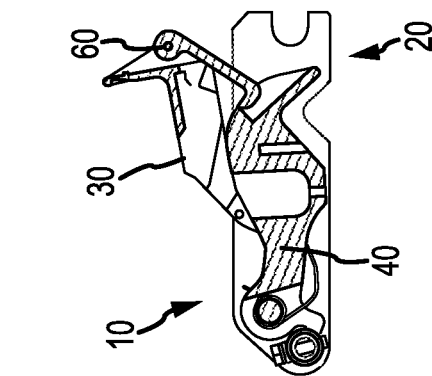
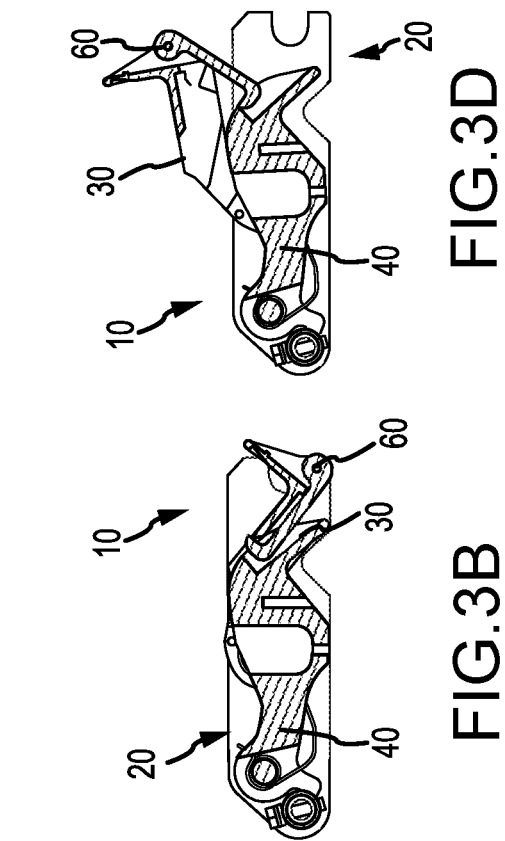

POSITIVE UP LOCK 2-PAWL PALLET RESTRAINT

FIELD

The present disclosure relates to cargo restraints and, more particularly, to a two-pawl cargo restraint with a locking pawl to lock the two pawls in an erect position.

BACKGROUND

Aircraft may transport cargo. These aircraft may include various restraints for restraining the cargo during taxi, takeoff, and landing. The restraints may restrain cargo in any one or more direction. For example, a first type of restraint may restrain cargo along a longitudinal axis of the aircraft, another type of restraint may restrain cargo along a width of the aircraft, and yet another restraint may restrain cargo along a vertical direction.

Some cargo restraints may be manually actuated between a retracted position in which they avoid moving cargo and an erected position in which they restrain cargo within the aircraft. These cargo restraints may include many forms. One such form includes two pawls that interface with each other and include an elastic element to lock the two pawls in the retracted position and in the erected position.

SUMMARY

Disclosed herein is a cargo restraint. The cargo restraint includes a housing. The cargo restraint further includes an inner pawl and an outer pawl coupled to the housing and configured to rotate between a retracted position and an erected position relative to the housing. The cargo restraint further includes a locking pawl rotatably coupled to at least one of the inner pawl or the outer pawl and configured to rotate between a locked position in which the inner pawl and the outer pawl are locked in the erected position and an unlocked position.

In any of the foregoing embodiments, the locking pawl is configured to automatically be positioned in the locked position in response to the inner pawl and the outer pawl being rotated to the erected position.

Any of the foregoing embodiments may further include a spring configured to apply a force to automatically position the locking pawl in the locked position.

In any of the foregoing embodiments, the locking pawl is rotatably coupled to the outer pawl.

In any of the foregoing embodiments, the spring is coupled to the locking pawl and the outer pawl.

In any of the foregoing embodiments, the spring is configured to apply a rotational force to the locking pawl towards the inner pawl.

In any of the foregoing embodiments, the locking pawl includes an outer portion rotatably coupled to the outer pawl and an inner portion having a hook configured to interface with a portion of the inner pawl in response to the locking pawl being in the locked position.

In any of the foregoing embodiments, the locking pawl includes a lip located at the inner portion to facilitate rotation of the locking pawl from the locked position to the unlocked position.

In any of the foregoing embodiments, the outer pawl and the inner pawl each include a housing end configured to be coupled to the housing and an outer end opposite the housing end, and wherein the locking pawl is rotatably coupled to the outer end of the outer pawl and is configured to interface with the inner pawl.

In any of the foregoing embodiments, the outer pawl includes a restraint surface located at the outer end of the outer pawl, the restraint surface configured to interface with and restrain cargo in a cargo bay of an aircraft.

In any of the foregoing embodiments, the inner pawl and the outer pawl are configured to be manually actuated between the retracted position and the erected position.

Also disclosed is a cargo restraint. The cargo restraint includes a housing. The cargo restraint further includes an inner pawl and an outer pawl coupled to the housing and configured to rotate between a retracted position and an erected position relative to the housing. The cargo restraint further includes a spring. The cargo restraint further includes a locking pawl rotatably coupled to at least one of the inner pawl or the outer pawl and to the spring, the spring configured to rotate the locking pawl from an unlocked position to a locked position in which the inner pawl and the outer pawl are locked in the erected position.

In any of the foregoing embodiments, the spring is configured to automatically position the locking pawl in the locked position in response to the inner pawl and the outer pawl being rotated to the erected position.

In any of the foregoing embodiments, the locking pawl is rotatably coupled to the outer pawl and the spring is coupled to the outer pawl.

In any of the foregoing embodiments, the spring is configured to apply a rotational force to the locking pawl towards the inner pawl.

In any of the foregoing embodiments, the locking pawl includes an outer portion rotatably coupled to the outer pawl and an inner portion having a hook configured to interface with a portion of the inner pawl in response to the locking pawl being in the locked position.

In any of the foregoing embodiments, the locking pawl includes a lip located at the inner portion to facilitate rotation of the locking pawl from the locked position to the unlocked position.

In any of the foregoing embodiments, the outer pawl and the inner pawl each include a housing end configured to be coupled to the housing and an outer end opposite the housing end, and wherein the locking pawl is rotatably coupled to the outer end of the outer pawl and is configured to interface with the inner pawl.

Also disclosed is a cargo restraint. The cargo restraint includes a housing. The cargo restraint further includes an inner pawl and an outer pawl each having a housing end coupled to the housing and an outer end opposite the housing end, the inner pawl and the outer pawl configured to rotate between a retracted position and an erected position relative to the housing, and the outer pawl having a restraint surface located at the outer end of the outer pawl and configured to interface with and restrain cargo in a cargo bay of an aircraft. The cargo restraint further includes a locking pawl rotatably coupled to the outer pawl and configured to rotate between a locked position in which the inner pawl and the outer pawl are locked in the erected position and an unlocked position.

Any of the foregoing embodiments may further include a spring coupled to the outer pawl and to the locking pawl and configured to apply a rotational force to the locking pawl towards the inner pawl to automatically position the locking pawl in the locked position in response to the inner pawl and the outer pawl being in the erected position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3C, 3E, and 3G illustrate perspective views of the cargo restraint of FIG. 1 actuating from the restrained position to the erected position, in accordance with various embodiments; and FIGS. 3B, 3D, 3F, and 3H illustrate cross-sectional views of the cargo restraint of FIG. 1 actuating from the restrained position to the erected position, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
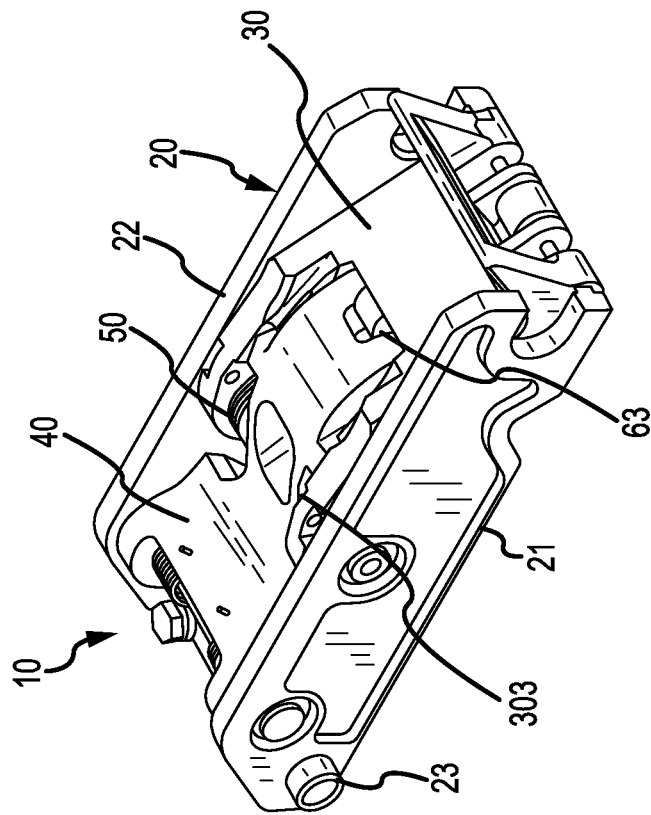
FIG. 1 illustrates a cargo restraint for restraining cargo in a cargo bay of an aircraft in an erected position, in accordance with various embodiments.
Figure 2:
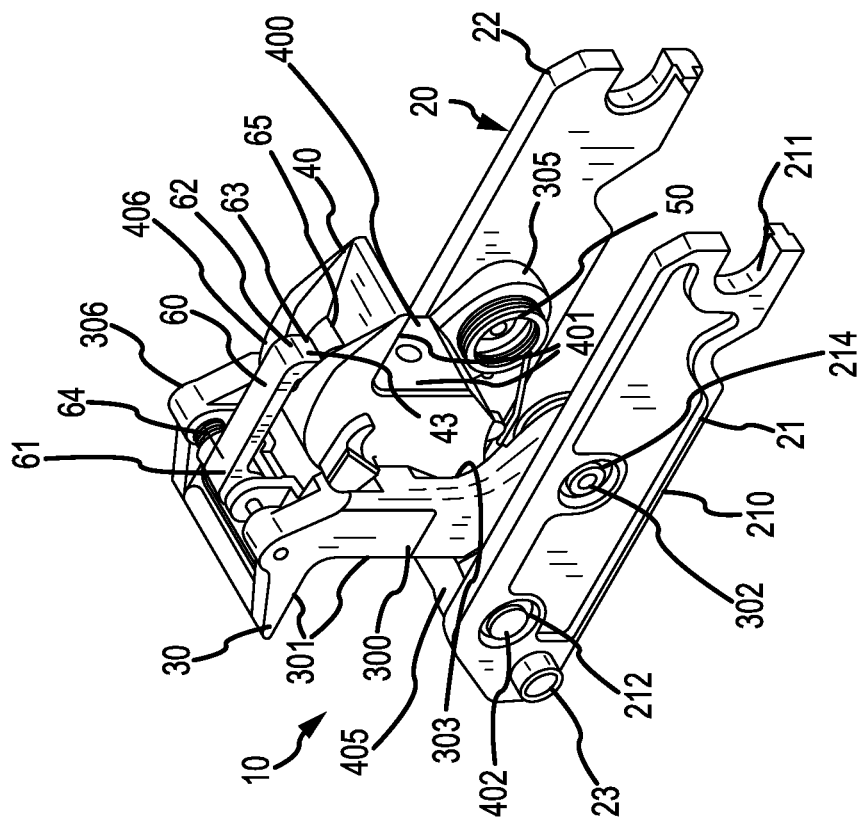
FIG. 2 illustrates the cargo restraint of FIG. 1 in a retracted position, in accordance with various embodiments.

With reference to FIGS. 1 and 2, a cargo restraint assembly 10, or cargo restraint 10, is provided for use with a cargo handling system. The cargo restraint 10 includes a housing 20, an outer pawl 30, an inner pawl 40, and an elastic element 50. The outer pawl 30 and the inner pawl 40 can be extended relative to the housing 20 to thereby engage with a unit load device (ULD, or cargo) to lock the ULD in place in a cargo handling system. Unit load devices are features by which luggage, freight, mail or any other suitable cargo are loadable within aircraft. The outer pawl 30 and the inner pawl 40 can also be retracted relative to the housing 20 to allow cargo to move freely during loading and unloading operations.

The housing 20 generally includes a first side plate 21 and a second side plate 22 that is disposed to face the first side plate 21 at a distance. The first side plate 21 includes a body 210 that is formed to define a fastener feature 211 at an axial end thereof which is remote from the cross-beam 23, a first through-hole 212 proximate to the cross-beam 23, and a second through-hole 214 between the first through-hole 212 and the fastener feature 211. The second side plate 22 includes similar features as the first side plate 21. The housing 20 may further include a panel body which is locatable along walls or a floor of a cargo area and which is formed to define an interior in which the first side plate 21 and the second side plate 22 are disposable.

The outer pawl 30 includes an elongate outer pawl body 300, transversely oriented restraint surfaces 301 at a distal end, or outer end 306, of the elongate outer pawl body 300, and a rotational connection 302. The rotational connection 302 is provided at a proximal end, or housing end 305, of the elongate outer pawl body 300 such that the outer pawl 30 is rotatably coupled to the housing 20 to occupy and rotate between a first retracted position relative to the housing 20 (shown in FIG. 2) and a first erected position relative to the housing 20 (shown in FIG. 1). The elongate outer pawl body 300 may include three main components: a central component, a toe component at the outer end 306 and that extends transversely in a first direction from the central component at the outer end 306, and a foot component at the housing end 305 and that extends transversely in a second direction from the central component at the housing end 305. The toe component and the central component respectively form the transversely oriented restraint surfaces 301, and the first and second directions may be nearly but not completely opposite one another. The central component and the foot component are formed to define an aperture 303.

The rotational connection 302 is provided as a pair of rotational connections that rotatably couple opposite sides of the foot component to the first side plate 21 and the second side plate 22 at the second through-hole 214. The rotational connection 302 defines a rotational axis of the outer pawl 30 whereby the outer pawl 30 rotates about the rotational axis in a first direction to move from the first retracted position relative to the housing 20 to the first erected position relative to the housing 20, and in a second direction opposite the first direction to move from the first erected position relative to the housing 20 to the first retracted position relative to the housing 20.

The inner pawl 40 includes an elongate inner pawl body 400, transversely oriented restraint surfaces 401 at a distal end, or outer end 406, of the elongate inner pawl body 400, and a rotational connection 402. The rotational connection 402 is provided at a proximal end, or housing end 405, of the elongate inner pawl body 400 such that the inner pawl 40 is rotatably coupled to the housing 20 to occupy and rotate between a second retracted position relative to the housing 20 (shown in FIG. 2) and a second erected position relative to the housing 20 (shown in FIG. 1). The elongate inner pawl body 400 may include three main components: a central component, a toe component at the outer end 406 and that extends transversely in a first direction from the central component at the outer end 406, and a foot component at the housing end 405 and that extends transversely in a second direction from the central component at the housing end 405. The toe component and the central component respectively form the transversely oriented restraint surfaces 401, and the first and second directions may be nearly but not completely opposite one another. The central component and the foot component are sized to fit within the aperture 303.

With the central component and the foot component being sized to fit within the aperture 303, the inner pawl 40 can rotate with the outer pawl 30 without the outer pawl 30 and the inner pawl 40 interfering with one another. In addition, when the outer pawl 30 occupies the first erected position relative to the housing 20 and the inner pawl 40 occupies the second erected position relative to the housing 20, the respective central components overlap with one another and the respective toe components extend in substantially opposite directions.

The rotational connection 402 defines a rotational axis of the inner pawl 40 whereby the inner pawl 40 rotates about the rotational axis in a second direction to move from the second retracted position relative to the housing 20 to the second erected position relative to the housing 20, and in a first direction opposite the second direction to move from the second erected position relative to the housing 20 to the second retracted position relative to the housing 20.

The elastic element 50 may be provided as a torsional spring. The couplings between the elastic element 50 and the outer pawl 30 and between the elastic element 50 and the inner pawl 40 are configured such that the outer pawl 30 and the inner pawl 40 are rotatable together. That is, as the outer pawl 30 rotates between the first retracted position relative to the housing 20 and the first erected position relative to the housing 20, the elastic element 50 causes the inner pawl 40 to correspondingly rotate between the second retracted position relative to the housing 20 and the second erected position relative to the housing 20. Similarly, as the outer pawl 30 rotates between the first erected position relative to the housing 20 and the first retracted position relative to the housing 20, the elastic element 50 causes the inner pawl 40 to correspondingly rotate between the second erected position relative to the housing 20 and the second retracted position relative to the housing 20. Additionally, the elastic element 50 may include a biasing curvature. This biasing curvature may be configured such that the outer pawl 30 and the inner pawl 40 are biased to remain in the first and second retracted positions, respectively, and to remain in the first and second erected positions, respectively.

Occasionally, a two-pawl pallet restraint may be susceptible to being retracted from its upright position in response to an inner pawl being contracted from an upper side of the inner pawl with sufficient force to overcome the elastic element holding the restraint in the up-lock position. In that regard, the restraint 10 includes a locking pawl 60. The locking pawl 60 is rotatably coupled to the outer end 306 of the outer pawl 30. In particular, the locking pawl 60 has an outer portion 61 that is rotatably coupled to the outer pawl 30 along with an inner portion 62 that includes a hook 63. The hook 63 is designed to interface with a portion of the inner pawl 40 at the outer end 406. For example, the inner pawl 40 may include a flange 43 which interfaces with the hook 63. The interface between the inner pawl 40 and the locking pawl 60 locks the inner pawl 40 and the outer pawl 30 in the erected position (i.e., the locked position of the locking pawl 60). The hook 63 may be rotated away from the flange 43 to unlock the inner pawl 40 from the outer pawl 30 (i.e., the unlocked position of the locking pawl 60).

The locking pawl 60 may include an elastic element 64, such as a torsional spring. The elastic element 64 may be coupled to the locking pawl 60 and the outer pawl 30 and may apply a rotational force to the locking pawl 60 towards the inner pawl 40. In that regard, the elastic element 64 may automatically position the locking pawl 60 in the locked position in response to the inner pawl 40 and the outer pawl 30 being rotated to the erect position.

In various embodiments, the locking pawl 60 may further include a lip 65 extending beyond the hook 63 in a direction away from the outer portion 61. The lip 65 may facilitate manual rotation of the locking pawl 60 from the locked position to the unlocked position. In particular, the lip may facilitate this manual rotation by a foot of an operator.

Referring now to FIGS. 3A, 3B, 3C, 3D, 3E, 3F, 3G, and 3H, operation of the restraint 10 is shown. As shown in FIGS. 3A and 3B, the restraint 10 is in the fully retracted position. The inner pawl 40, outer pawl 30, and locking pawl 60 are substantially located within the housing 20.

In FIGS. 3C and 3D, the outer pawl 30 is being raised towards the erected position. As shown, the locking pawl 60 fails to interfere with the rotation of the outer pawl 30, and fails to interfere with the inner pawl 40.

In FIGS. 3E and 3F, both the outer pawl 30 and the inner pawl 40 are nearing the erected position. The locking pawl 60 still fails to interfere with the rotation of the outer pawl 30 and the inner pawl 40, and fails to completely interface with the inner pawl 40.

In FIGS. 3G and 3H, the outer pawl 30 and the inner pawl 40 are in the fully erected position. As shown, the elastic element 64 of the locking pawl 60 forces the locking pawl 60 to interface with the inner pawl 40, thus causing the locking pawl 60 to be in the locked position. The locking pawl 60 reduces the likelihood of the inner pawl 40 rotating relative to the outer pawl 30 without actuating the locking pawl 60 from the locked position to the unlocked position.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo restraint, comprising:
   a housing;
   an inner pawl and an outer pawl coupled to the housing and configured to rotate between a retracted position and an erected position relative to the housing;
   an elastic element coupled to the inner pawl and to the outer pawl, wherein a first coupling between the elastic element and the inner pawl and a second coupling between the elastic element and the outer pawl are configured such that as the outer pawl rotates between the retracted position and the erected position, the elastic element causes the inner pawl to correspondingly rotate between the retracted position and the erected position, and wherein the first coupling and the second coupling are configured such that as the outer pawl rotates between the erected position and the retracted position, the elastic element causes the inner pawl to correspondingly rotate between the erected position and the retracted position; and
   a locking pawl rotatably coupled to at least one of the inner pawl or the outer pawl and configured to rotate between a locked position in which the inner pawl and the outer pawl are locked in the erected position and an unlocked position.

2. The cargo restraint of claim 1, wherein the locking pawl is configured to automatically be positioned in the locked position in response to the inner pawl and the outer pawl being rotated to the erected position.

3. The cargo restraint of claim 2, further comprising a spring configured to apply a force to automatically position the locking pawl in the locked position.

4. The cargo restraint of claim 3, wherein the locking pawl is rotatably coupled to the outer pawl.

5. The cargo restraint of claim 4, wherein the spring is coupled to the locking pawl and the outer pawl.

6. The cargo restraint of claim 5, wherein the spring is configured to apply a rotational force to the locking pawl towards the inner pawl.

7. The cargo restraint of claim 4, wherein the locking pawl includes an outer portion rotatably coupled to the outer pawl and an inner portion having a hook configured to interface with a portion of the inner pawl in response to the locking pawl being in the locked position.

8. The cargo restraint of claim 7, wherein the locking pawl includes a lip located at the inner portion to facilitate rotation of the locking pawl from the locked position to the unlocked position.

9. The cargo restraint of claim 7, wherein the outer pawl and the inner pawl each include a housing end configured to be coupled to the housing and an outer end opposite the housing end, and wherein the locking pawl is rotatably coupled to the outer end of the outer pawl and is configured to interface with the inner pawl.

10. The cargo restraint of claim 9, wherein the outer pawl includes a restraint surface located at the outer end of the outer pawl, the restraint surface configured to interface with and restrain cargo in a cargo bay of an aircraft.

11. The cargo restraint of claim 10, wherein the inner pawl and the outer pawl are configured to be manually actuated between the retracted position and the erected position.

12. A cargo restraint, comprising:
    a housing;
    an inner pawl and an outer pawl coupled to the housing and configured to rotate between a retracted position and an erected position relative to the housing;
    an elastic element coupled to the inner pawl and to the outer pawl, wherein a first coupling between the elastic element and the inner pawl and a second coupling between the elastic element and the outer pawl are configured such that as the outer pawl rotates between the retracted position and the erected position, the elastic element causes the inner pawl to correspondingly rotate between the retracted position and the erected position, and wherein the first coupling and the second coupling are configured such that as the outer pawl rotates between the erected position and the retracted position, the elastic element causes the inner pawl to correspondingly rotate between the erected position and the retracted position;
    a spring; and
    a locking pawl rotatably coupled to at least one of the inner pawl or the outer pawl and to the spring, the spring configured to rotate the locking pawl from an unlocked position to a locked position in which the inner pawl and the outer pawl are locked in the erected position.

13. The cargo restraint of claim 12, wherein the spring is configured to automatically position the locking pawl in the locked position in response to the inner pawl and the outer pawl being rotated to the erected position.

14. The cargo restraint of claim 12, wherein the locking pawl is rotatably coupled to the outer pawl and the spring is coupled to the outer pawl.

15. The cargo restraint of claim 14, wherein the spring is configured to apply a rotational force to the locking pawl towards the inner pawl.

16. The cargo restraint of claim 14, wherein the locking pawl includes an outer portion rotatably coupled to the outer pawl and an inner portion having a hook configured to interface with a portion of the inner pawl in response to the locking pawl being in the locked position.

17. The cargo restraint of claim 16, wherein the locking pawl includes a lip located at the inner portion to facilitate rotation of the locking pawl from the locked position to the unlocked position.

18. The cargo restraint of claim 16, wherein the outer pawl and the inner pawl each include a housing end configured to be coupled to the housing and an outer end opposite the housing end, and wherein the locking pawl is rotatably coupled to the outer end of the outer pawl and is configured to interface with the inner pawl.

19. A cargo restraint, comprising:
    a housing;
    an inner pawl and an outer pawl each having a housing end coupled to the housing and an outer end opposite the housing end, the inner pawl and the outer pawl configured to rotate between a retracted position and an erected position relative to the housing, and the outer pawl having a restraint surface located at the outer end of the outer pawl and configured to interface with and restrain cargo in a cargo bay of an aircraft;

an elastic element coupled to the inner pawl and to the outer pawl, wherein a first coupling between the elastic element and the inner pawl and a second coupling between the elastic element and the outer pawl are configured such that as the outer pawl rotates between the retracted position and the erected position, the elastic element causes the inner pawl to correspondingly rotate between the retracted position and the erected position, and wherein the first coupling and the second coupling are configured such that as the outer pawl rotates between the erected position and the retracted position, the elastic element causes the inner pawl to correspondingly rotate between the erected position and the retracted position; and a locking pawl rotatably coupled to the outer pawl and configured to rotate between a locked position in which the inner pawl and the outer pawl are locked in the erected position and an unlocked position.

20. The cargo restraint of claim 19, further comprising a spring coupled to the outer pawl and to the locking pawl and configured to apply a rotational force to the locking pawl towards the inner pawl to automatically position the locking pawl in the locked position in response to the inner pawl and the outer pawl being in the erected position.

\* \* \* \* \*